April 24, 1956 — E. P. TURNER — 2,743,384
EVAPORATIVE COOLING SYSTEMS FOR ELECTRIC MOTORS
Filed May 12, 1953
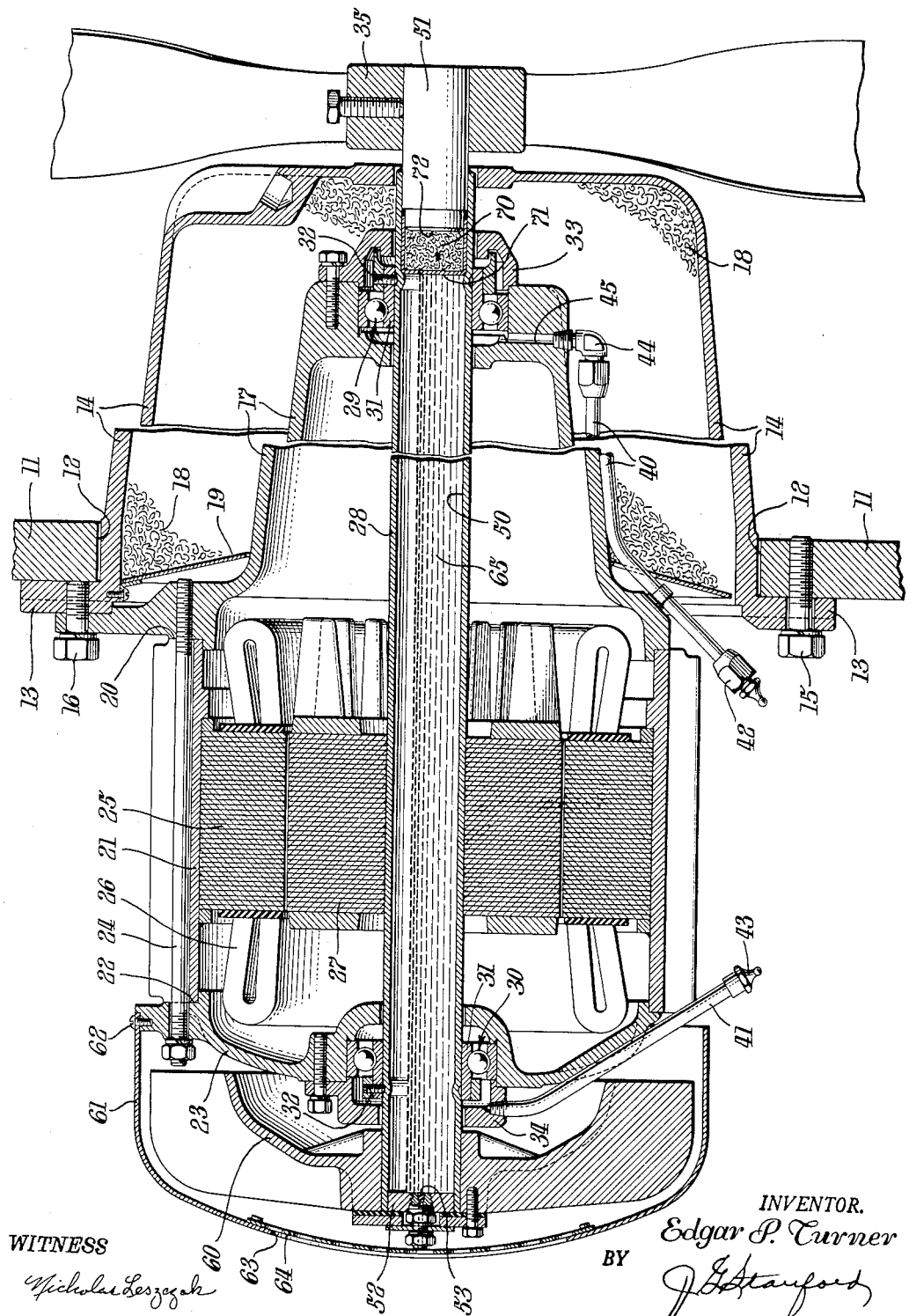
INVENTOR.
Edgar P. Turner
BY
ATTORNEY

United States Patent Office 2,743,384
Patented Apr. 24, 1956

2,743,384

EVAPORATIVE COOLING SYSTEMS FOR ELECTRIC MOTORS

Edgar P. Turner, Fanwood, N. J., assignor to The Singer Manufacturing Company, Elizabeth, N. J., a corporation of New Jersey Application May 12, 1953, Serial No. 354,457

4 Claims. (Cl. 310—54)

This invention relates to electric motors and, more particularly, to a cooling system adapted for incorporation into an electric motor construction to facilitate dissipation of heat generated either by the motor itself or by heat entering the motor from an adjacent source.

It is a primary object of this invention to provide a cooling system adapted to control the flow of heat along a rotating shaft such as the drive shaft of an electric motor.

Of the many factors in electric motor construction which dictate the heat dissipation requirements, the insulation of the windings and the shaft bearing lubrication are of prime importance. Where electric motors must be located in close proximity to an adjacent source of heat, bearing lubrication, in most cases, assumes a greater importance in this regard, and this is especially so when the shaft bearing must be located between the motor and a source of heat. The selected embodiment which will be described hereinafter and is illustrated in the accompanying drawing, concerns an adaptation of my invention to an electric motor which is mounted upon the wall of a heated chamber and arranged to drive devices located within the chamber. The selected embodiment exemplifies the fact that my evaporative cooling system may be used to protect the motor shaft bearings, the internal parts of the motor, or both.

It is a more specific object of this invention, therefore, to provide a cooling system for an electric motor by which objectionable heat from sources outside the motor may be controlled and dissipated so as to protect the motor and the motor shaft bearings from overheating.

It is also an object to provide a cooling system which may be applied to a totally enclosed electric motor.

With the above and other objects and advantages in view, as will hereinafter appear, this invention comprises the devices, combinations and arrangement of parts hereinafter described and illustrated in the accompanying cross-sectional view of an electric motor showing a portion of the wall of a heated chamber on which the motor is supported.

Referring more particularly to the drawing, 11 indicates the wall of a heated chamber such as an oven or furnace in which wall is formed an aperture 12. Abutting the wall 11 around the outside periphery of the aperture 12 is a flange rim portion 13 of a bell-shaped shield member 14 which extends from its rim portion into the heated chamber. The shield member is maintained in position by means of bolts 15 which fasten the rim portion 13 to the chamber wall 11. Secured as by bolts 16 to the rim portion 13 of the shield member 14 is an end housing 17 of an electric motor frame, which housing is generally bell-shaped but substantially smaller and arranged to extend within the shield member 14. The space between the shield member 14 and the end housing 17 is filled with insulation material 18 which is maintained tightly in place by an annular sheet metal keeper plate 19 which is secured to the shield member.

The end housing 17 of the motor frame is formed with an annular seat 20 adapted to accommodate one end portion of a cylindrical stator shell 21. The opposite end portion of the stator shell is similarly received in a seat 22 formed in an end housing 23. Stud bolts 24 which pass through end housing 23 and the stator shell 21 are threaded into the end housing 16 to lock together the motor frame components.

The motor frame, therefore, is of the type which completely encloses the internal parts of the motor.

The motor illustrated in the drawing is of the squirrel cage induction type. Fixed as by welding to the inner wall of the cylindrical stator shell 21 is a stator core 25 provided with stator windings 26. Cooperating with the stator is a squirrel cage rotor 27 fixed for rotation with a motor shaft 28 which is journaled in antifriction bearings 29 and 30 seated in each of the frame end housings 17 and 23, respectively. The bearings 29 and 30 are each preferably of the type having a laterally extended inner race 31 which is fixed to the motor shaft as by set screws 32—32. The bearings are retained in place with respect to the motor frame by means of bearing-retaining end caps 33—34 secured to the end housing 16 and 23 respectively.

The motor shaft 28 extends through the bell shaped shield member 14 and into the heated chamber, at which point it is adapted to drive any of a variety of devices within the chamber, as for instance a conveyor, an agitator, a fan, or the like. In the drawing, a fan blade hub 35 is shown fixed to the motor shaft within the chamber.

Reference is made particularly to bearing 29 which, as shown in the drawing, is disposed closely adjacent to the fan hub 35 and at a considerable distance from the rotor 27. With this arrangement, the unsupported shaft length from the bearing 29 to the load represented by the fan hub 35 is reduced to a minimum, thereby reducing vibration and permitting utilization of a motor shaft of minimum diameter for any particular load.

In order to supply lubricant to each of the bearings 29, 30, supply pipes 40 and 41 are provided, each terminating in grease gun fittings 42 and 43, respectively, at a point outside the motor frame. The pipe 41 is threaded into an aperture in the bearing-retaining end cap 34 to supply lubricant to bearing 30, while pipe 40 is fitted with an elbow 44 which is threaded into a tapped hole 45 through the end housing 17 which hole leads to bearing 29.

Objectionable heat which is detrimental to both the internal parts of the motor and to the proper and efficient lubrication of the motor shaft bearings, arises principally from two sources, first, from the operation of the motor, and second, from the heat within the heated chamber which is transferred into the motor.

The insulation material 18 disposed between the shield member 14 and the end housing 17 of the motor serves to protect the motor and the bearings from direct transfer of heat from the chamber. However, an appreciable amount of heat is normally transferred to the bearings and to the motor along the motor shaft. In order for the bearing 29 to be disposed closely adjacent the fan hub as is preferable in order to reduce objectionable shaft vibration, the bearing must be protected from the heat which is transferred along the shaft by conduction from the heated chamber.

Similarly, a part of the heat which is generated by the motor itself is transferred into the motor shaft. This is particularly true in the case of totally enclosed type motors.

The cooling system of the present invention is designed to facilitate and control heat transfer along the motor shaft and to provide for simultaneous dissipation of heat from several sources along the shaft. My invention provides an evaporative cooling system arranged within a chamber formed within the motor shaft. The chamber is partially filled with a volatile liquid which absorbs heat and is vaporized at one or more points along the shaft and gives up heat and is condensed at other points along the shaft where the heat may be conveniently dissipated to the atmosphere. To this end, the motor shaft 28 is formed with an axial bore 50 which extends from the free end of the shaft outside the heated chamber to a point between the bearing 29 and the fan hub 35. In practice the motor shaft is made tubular and fitted with a solid shaft extension 51 which is welded in place and extends into the heated chamber. At the end of the shaft opposite the heated chamber, the shaft bore is closed by a cap piece 52 which is welded in place and is provided with a fusible blow-out plug 53 which serves to protect the motor in the event that abnormal pressures develop within the shaft bore.

Affixed to the shaft at its free extremity beyond the end housing 23 is a fan blade 60 which is enclosed by a sheet metal guard member 61 fastened to the end housing 22 by screws 62. The guard member is provided with a central aperture 63 which is fitted with a perforated grille 64. When the motor is running, the fan 60 serves to circulate air through the grille 64 and over the exterior surface of the motor frame. When the motor shaft is stopped, natural convection of air induced by the relatively large heated surface area of the fan blade 60 serves to dissipate heat from the fan blade and thus by conduction from the portion of the hollow motor shaft to which the fan blade is affixed.

The shaft bore 50 is partially filled with a volatile liquid 65, that is, a liquid which is chosen to have a boiling point substantially less than the temperature which is expected in the shaft. It has been found that water provides a suitable liquid for use in the instant evaporative cooling system and will operate successfully over a wide range of temperature conditions. In the construction of the drawings water has been found most suitable for oven temperatures in the neighborhood of 500° F. However, it will be understood that a different volatile liquid or a mixture may be selected in order to obtain a particularly suitable range of boiling points. Alcohol, as an example, would be more suitable where the temperature range is lower. Moreover, the boiling point of the volatile liquid may be adjusted by changing the pressure within the bore at the time the liquid is introduced.

In the construction illustrated in the drawings using a motor shaft having an outside diameter of 1⅞″, an inside diameter of 1 9/16″, the bore being approximately ¾ filled with water and evacuated to a pressure of approximately 1 inch of mercury at room temperature, it has been found that the motor shaft adjacent the bearing 29 will be maintained at a temperature of approximately 220° F. with an oven temperature of 500° F.

Heat which is being transferred by conduction, as it is along the motor shaft from the heated chamber, will flow or be transferred into the area or medium of lowest temperature. The liquid and vapor mixture within the hollow shaft will remain at substantially a constant temperature. This is so because such mixtures in a closed container obey very critical relationships between temperature, pressure, and specific volume. Should one portion attain a slightly higher temperature than another, a corresponding pressure differential also must exist, which differentials are quickly neutralized or absorbed by the remainder of the mixture, usually by an induced circulation thereof. The temperature of the mixture in the shaft at any time will, of course, be dependent upon the rate at which heat is added and the rate at which it is dissipated by the fan blade 60.

A lower temperature may be maintained by the provision of a plug of insulation material 70 which is sealed within a sheet metal capsule 71 and secured to the oven end surface 72 of the solid shaft extension 51. This plug of insulation prevents direct transfer of heat from the end surface 72 of the solid shaft to the volatile liquid in the shaft bore. In other words, the insulation lowers the rate at which heat is added to the volatile liquid and, therefore, lowers its temperature.

It will be understood that heat from the oven reaches the bearing 29 principally by conduction along the motor shaft. Heat transfer by conduction along the shaft depends on the existence of a temperature gradient along the shaft. Since heat transfer occurs preferentially toward the lowest temperature, the heat from the oven will be transferred to the volatile liquid within the bore rather than to proceed along the shaft because of the abrupt temperature differential which exists between the liquid and the shaft walls in comparison with the more gradual temperature gradient which exists along the metal walls of the shaft. The heat flow is therefore, effectively bypassed around the bearing 29 and into the liquid within the shaft bore.

Upon addition of heat, the liquid within the shaft bore evaporates to the extent that temperature and pressure conditions within the sealed bore will permit. A certain amount of latent heat of evaporation will be absorbed by the liquid without a change in liquid temperature, but since the axial bore containing the liquid is sealed, the evaporation will give rise to increased pressures and increased temperatures such that only a portion of the liquid will evaporate and, therefore, only a portion of the heat absorbed by the liquid will be latent heat of evaporation.

The heated volatile liquid will maintain a substantially constant temperature throughout, as mentioned before. This is due not only to natural convection currents, but also to the tendency of the vaporized portion of the liquid to rise, and due to the rotation of the shaft when the motor is running. It has been found that as long as the heated extremity of the shaft is not raised above the level of the free end of the shaft, the liquid bath will be maintained in contact with the heated end of the hollow shaft, and will provide for a circulation of liquid and vapor to the free extremity of the shaft where heat will be dissipated through the walls of the shaft through the cooling fan blade 60 and to the atmosphere.

It will be appreciated that the evaporative cooling system of this invention is equally well adapted to cool the internal parts of an electric motor. Where motors must be completely enclosed, my evaporative cooling system becomes especially advantageous because of its compact nature, and especially in view of the fact that no auxiliary operating mechanism, pumps, or special heat exchangers are required. The cooling system of this invention provides a completely self contained and automatically operative arrangement.

Having thus set forth the nature of the invention, what I claim herein is:

1. In an electric motor having a frame adapted to be secured to one wall of a heated chamber, a bearing carried by said frame, a motor-shaft journaled in said bearing, and having one extremity adapted to extend into said heated chamber, means cooling said bearing comprising heat dissipating means carried by said shaft outside said chamber, said shaft being formed with a closed longitudinal bore extending from a point adjacent said bearing to a point adjacent said heat dissipating means and a volatile liquid partially filling said closed longitudinal bore, said liquid having a boiling point substantially lower than the temperature of said heated chamber.

2. In an electric motor having a frame adapted to be secured to one wall of a heated chamber, a bearing carried by said frame, a motor-shaft journaled in said bearing, said shaft having one extremity adapted to extend into said heated chamber, and heat dissipating means associated with the opposite extremity of said motor shaft, means cooling said bearing comprising an axial bore formed in said motor shaft, means closing said bore at one extremity between said bearing and said heated chamber, means closing the opposite extremity of said bore adjacent said heat dissipating means, insulating material completely filling that portion of said bore between said bearing and the bore extremity adjacent said heated chamber, and a volatile liquid partially filling the remainder of said bore.

3. In an electric motor having means associated therewith for dissipating heat generated by operation of said motor and a motor shaft adapted to extend into and drive devices located within a heated chamber, a shaft bearing arranged between said motor and said driven devices, and means for cooling said bearing comprising an axial bore formed in said motor shaft, means closing one extremity of said bore adjacent said bearing, means closing the opposite extremity of said bore adjacent said heat dissipating means of said motor, said bore being partially filled with a volatile liquid having a boiling point substantially lower than the temperature of said heated chamber.

4. In an electric motor heaving a frame, a shaft journaled in said frame a stator carried by said frame and a rotor carried by said shaft and disposed in operative association with said stator, a cooling system adapted to extract heat from said rotor comprising heat dissipating means carried by said shaft at a point remote from said rotor, a bearing arranged to engage said shaft at a point between said rotor and said heat dissipating means, said shaft formed with a closed axial bore extending from a point adjacent said rotor to a point adjacent said heat dissipating means, and a volatile liquid partially filling said closed axial bore.

References Cited in the file of this patent
UNITED STATES PATENTS

| | | |
|---|---|---|
| 2,081,454 | Hollander | May 25, 1937 |
| 2,330,121 | Heintz | Sept. 21, 1943 |
| 2,510,632 | Hemphill | June 6, 1950 |